United States Patent [19]
Johnson

[11] Patent Number: 5,450,579
[45] Date of Patent: Sep. 12, 1995

[54] METHOD AND APPARATUS FOR ERROR RECOVERY IN COMPUTER PERIPHERAL DEVICES

[75] Inventor: Richard H. Johnson, San Jose, Calif.

[73] Assignee: International Business Machines Corporation, Armonk, N.Y.

[21] Appl. No.: 217,526

[22] Filed: Mar. 24, 1994

[51] Int. Cl.⁶ .............................................. G06F 13/00
[52] U.S. Cl. ........................... 395/650; 364/265.5; 364/DIG. 1; 395/481; 395/182.04; 395/182.14; 395/182.03; 395/183.18
[58] Field of Search ........................... 395/575, 275; 364/238.2, 238.3, 239.9, 260, 260.3, 265, 265.5

[56] References Cited

U.S. PATENT DOCUMENTS 5,371,885 12/1994 Letwin ................................ 395/600

OTHER PUBLICATIONS

*IBM Dictionary of Computing* by George McDaniel ©1994 by International Business Machines Corp. p. 695.

*Primary Examiner*—Vincent P. Canney
*Attorney, Agent, or Firm*—Baker, Maxham, Jester & Meador

[57] ABSTRACT

A method and apparatus for error recovery in various computer data storage devices that are associated with a host computer operating system includes an error recovery module that is coupled to each device driver in the host operating system. When one of the devices reports an error in the form of sense bytes to its associated device driver, the device driver sends the sense bytes and device type identification to the error recovery module. In turn, the error recovery module generates an action token based upon the sense bytes and device type, and then correlates the action token with error recovery actions. The device driver then executes the error recovery actions. Thus, a common error recovery module can be used in conjunction with a large variety of data storage devices.

21 Claims, 3 Drawing Sheets

| SKEY | ASC | ASCQ | OTHER | ACTION | TOKEN |
|------|-----|------|-------|--------|-------|
| 01 | 00 | 01 | 00 | N | |
| 01 | 00 | 10 | 00 | N+1 | |
| 01 | 00 | 11 | 00 | N+2 | |
| 01 | 01 | 00 | 00 | N+3 | |
| 01 | 01 | 01 | 00 | N+4 | |

FIG. 3

METHOD AND APPARATUS FOR ERROR RECOVERY IN COMPUTER PERIPHERAL DEVICES

BACKGROUND OF THE INVENTION

1. Field of the Invention

The present invention relates generally to computer peripheral device drivers, and more particularly to error recovery modules in computer peripheral device drivers.

2. Description of the Related Art

Many, if not most, computer systems provide for linking a host computer operating system to one or more peripheral devices which are used as data storage media. For example, the AIX and OS/2 operating systems made by International Business Machines Corporation of Armonk, N.Y. can interface with several different types of data storage peripheral devices that have a so-called Small Computer System Interface (SCSI) interface format.

Included among SCSI devices are magnetic tape data storage devices, magnetic disk data storage devices, and optical disk data storage devices. Also included among SCSI devices are medium changer library devices, each of which contains several data storage devices. In medium changer devices, one of the data storage disks at a time can be selected and then engaged with a transport element within the device for accessing data of a storage device.

Indeed, a multiplicity of data storage devices are made by various manufacturers, each of which may transfer data in accordance with its own unique operating command sequence. It is nonetheless desirable that a host operating system be capable of communicating with as many different types of data storage devices as possible, so as not to unduly restrict the ability of the operating system to interact with available data storage devices.

Accordingly, to permit the host operating system to communicate with several different types of data storage devices, the host operating system ordinarily includes software modules referred to as device drivers. For each data storage device sought to be used by the host operating system, the host operating system must include an associated device driver which is tailored for communicating with the particular device. Thus, each device driver functions as an intermediary between the operating system and the data storage device that is associated with the device driver. More particularly, the device driver receives input/output (I/O) requests from the operating system and then issues commands to its associated data storage device to satisfy the I/O requests.

An important function of a device driver is error recovery. More specifically, a data storage device may from time to time experience an error condition that impedes I/O from the device, and the device driver must provide error recovery support.

When a data storage device experiences an error condition, it generates a string of data, referred to as sense bytes, which represent the error condition, and the sense bytes are sent to the device driver. Based on the sense bytes, the device driver determines what error recovery action is appropriate given the particular error and the particular device, e.g., reset, retry, etc.

It is not unusual that while some commonality may exist between sense byte formats used by various data storage devices, what commonality does exist provides only a coarse, general indication of the error. Specific error indication can be provided only by reading the entire sense byte string, and, like other I/O functions performed by a particular data storage device, most of the sense byte string of a device may be unique to the particular device. Accordingly, the error recovery portion of a device driver must be tailored for the particular device to ascertain the nature of the reported error with satisfactory granularity.

Thus, for each type of data storage device sought to be used by an operating system, the operating system must include an associated device driver. It will be appreciated that each device driver must in turn include an error recovery module that is designed for the particular device. Unfortunately, such duplication of system design effort is time-consuming and costly.

As recognized by the present invention, however, while a particular data storage device may report error conditions using a sense byte format which is unique to the particular device, the underlying error conditions and required recovery actions for data storage devices of a particular type (e.g., tape drive, optical disk, or media changer) tend to be the same, device to device. Accordingly, it is an object of the present invention to provide an error recovery module that can be used interchangeably with many different types of device drivers, thereby avoiding duplicative system design. Another object of the present invention is to provide an error recovery module that can ascertain the nature of a reported error with satisfactory granularity. Still another object of the present invention is to provide an error recovery module which is easy to use and cost-effective.

SUMMARY OF THE INVENTION

An error recovery module is disclosed for use in a host computer. The host computer includes a first device driver and a second device driver operable in response to respective first and second command sequences for causing data transfer between the host computer and respective first and second data storage devices. Each data storage device generates sense bytes that are representative of an error condition in the data storage device, and the error recovery module is operably couplable to each of the device drivers.

In accordance with the present invention, the error recovery module includes a sense byte correlator for receiving the sense bytes from the data storage device and for generating one of a plurality of action tokens in response thereto. Additionally, the error recovery module includes an action executor for receiving the action token and for generating an action signal representative of one of a plurality of predetermined error recovery actions in response thereto. As intended by the present invention, the error recovery module sends the action signal to the device driver for facilitating error recovery.

In one presently preferred embodiment, a first error recovery module is associated with the first device driver and a second error recovery module is associated with the second device driver. In this embodiment, the first error recovery module is interchangeable with the second error recovery module. Alternatively, a single error recovery module can be provided which is common to all of the device drivers.

Preferably, the sense byte correlator includes first and second sense byte decoders respectively representing the first and second data storage devices. Each sense byte decoder correlates sense bytes from the associated storage device to the action tokens. As provided for by the present invention, the first data storage device can have operating characteristics that are different from the operating characteristics of the second data storage device.

Further, the action executor preferably includes a token decoder which is arranged for correlating action tokens received from the sense byte correlator to the predetermined error recovery actions. At least one of the data storage devices generates a respective plurality of sense bytes in response to each one of a predetermined plurality of error conditions in the data storage device, and the sense byte correlator generates the action token based upon each one of the sense bytes in the plurality of sense bytes generated by the data storage device.

In another aspect of the present invention, a computer system includes a host computer and a first data storage device which is coupled to the host computer for data transfer therebetween. As intended by the present invention, the first data storage device generates a first set of sense bytes when an error occurs in the first data storage device.

Also, the system of the present invention includes a second data storage device which is coupled to the host computer for data transfer therebetween. The second data storage device generates a second set of sense bytes different from the first when the error occurs in the second data storage device.

In accordance with the present invention, a first device driver is provided for controlling data transfer between the host computer and the first data storage device. A first error recovery module is associated with the first device driver for generating an action signal representative of a predetermined error recovery action in response to the first set of sense bytes. Further, a second device driver is provided for controlling data transfer between the host computer and the second data storage device, and a second error recovery module is associated with the second device driver for generating an action signal representative of a predetermined error recovery action in response to the second set of sense bytes. The first error recovery module is substantially identical to the second error recovery module.

In yet another aspect of the present invention, a data transfer system includes an operating system, and a plurality of data storage devices are associated with the operating system. Each data storage device is responsive to a respective command sequence for transferring data between the data storage device and the operating system, and the command sequence of one data storage device is different from the command sequence of another data storage device. Also, a plurality of device drivers are respectively associated with the data storage devices for controlling data transfer between the data storage devices and the operating system.

Importantly, error recovery means are operably couplable to each of the device drivers. The error recovery means includes correlating means for receiving sense bytes from one of the data storage devices and for generating one of a plurality of action tokens in response thereto. Additionally, the error recovery means includes executor means for receiving the action token and for generating an action signal representative of one of a plurality of predetermined error recovery actions in response thereto.

In still another aspect of the present invention, a method is disclosed for error recovery during data transfer between an operating system and a plurality of data storage devices which are responsive to respective device drivers. Each device driver can generate a respective command sequence, with the command sequence of one data storage device being different from the command sequence of another data storage device. The method of the present invention includes receiving sense bytes from one of the data storage devices and generating one of a plurality of action tokens in response. Then, the action token is received and an action signal is generated in response, with the action signal being representative of one of a plurality of predetermined error recovery actions.

In another aspect of the present invention, a method for error recovery in an operating system which includes a plurality of device drivers respectively associated with a plurality of data storage devices includes receiving sense bytes that are representative of an error condition from any one of a plurality of data storage devices. As intended by the present invention, first and second data storage devices in the plurality of data storage devices are responsive to respective first and second command sequences, and the first command sequence is different from the second command sequence. The sense bytes are nevertheless correlated to an action token based upon the characteristics of the one data storage device, and a recovery action for the error condition is determined in response to the action token.

The details of the present invention, both as to its structure and operation, can best be understood with reference to the accompanying drawings, in which like reference numerals refer to like parts, and in which:

BRIEF DESCRIPTION OF THE PREFERRED EMBODIMENTS

FIG. 3 is a schematic diagram of a sense byte decoder table; and

DETAILED DESCRIPTION OF THE PREFERRED EMBODIMENTS

Figure 1:
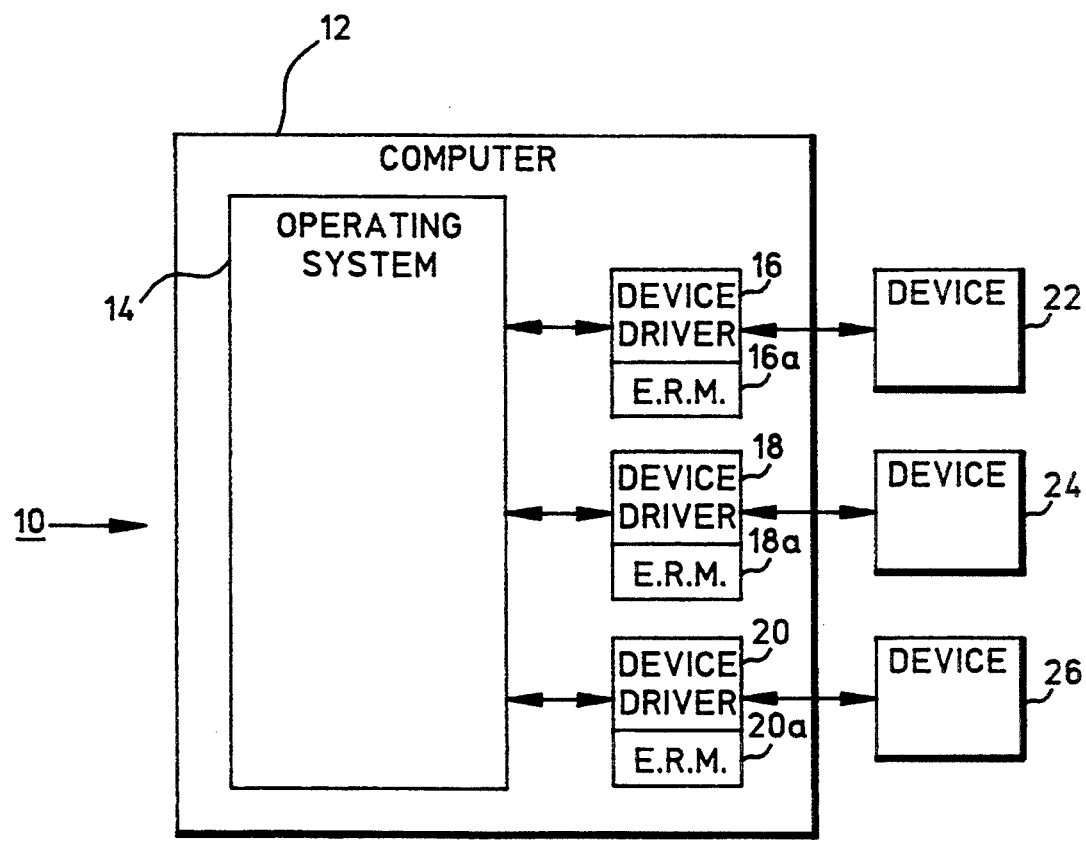
FIG. 1 is a schematic diagram of the data transfer system of the present invention.

Referring initially to FIG. 1, a data transfer system is shown, generally designated 10. As shown, the system 10 includes a computer 12 with associated operating system 14. In the presently preferred embodiment, the computer 12 is a type RISC System/6000 or PS/2 computer made by International Business Machines (IBM) Corporation of Armonk, N.Y. and the operating system 14 is an AIX or OS/2 operating system, also made by International Business Machines Corporation of Armonk, N.Y.

FIG. 1 shows that the system 10 includes a plurality of computer peripheral device drivers for controlling respective data storage devices. More particularly, the system includes first, second, and third device drivers 16, 18, 20 for respectively controlling first, second, and third data storage devices 22, 24, 26. It is to be understood that the system 10 can include greater or fewer device drivers.

In accordance with principles well-known in the art, each device driver 16, 18, 20 receives data input/output (I/O) requests from the operating system 14. Further, each device driver 16, 18, 20 executes each I/O request by issuing an appropriate command sequence to its associated data storage device 22, 24, 26 to cause the device 22, 24, 26 to transfer data in accordance with the I/O request. Thus, each device driver 16, 18, 20 is an intermediary between the operating system 14 and the associated data storage device 22, 24, 26. Stated differently, each device driver 16, 18, 20 functions as a data transfer controller between the operating system 14 and the associated data storage device 22, 24, 26.

As intended by the present invention, each device driver 16, 18, 20 includes a respective error recovery module (ERM) 16a, 18a, 20a, as more fully disclosed below. Like the operating system 14 and device drivers 16, 18, 20, the ERMs 16a, 18a, 20a may be embodied in hardware or firmware. Preferably, however, like the operating system 14 and device drivers 16, 18, 20, the ERMs 16a, 18a, 20a are embodied in software.

In accordance with the present invention, the data storage devices 22, 24, 26 may be any suitable device known in the art, and preferably include small computer system interface (SCSI) connections for operably engaging the devices 16, 18, 20 with the computer 12. For example, any one of the data storage devices 22, 24, 26 may be a type Exabyte 8200 tape drive, a type Exabyte 8500 tape drive, a type Exabyte 8500C tape drive, a type IBM 7209-001 or IBM 7209-002 optical drive, a type Exabyte 10i media changer, a type Exabyte 10e media changer, a type Exabyte 120 media changer, or any other suitable magnetic disk drive, optical drive, or media changer device which preferably has a SCSI architecture.

As indicated above, the data storage devices 22, 24, 26 may be different from each other, or may be similar devices made by different vendors. In other words, each data storage device 22, 24, 26 is responsive to a command sequence from its associated device driver 16, 18, 20 for transferring data between the data storage device 22, 24, 26 and the operating system 14, and the command sequence of one data storage device 22, 24, 26 may be different from the command sequence of another data storage device 22, 24, 26.

Any one of the data storage devices 22, 24, 26 can experience an error condition during an I/O operation. For example, the data storage media of any one of the devices 22, 24, 26 might fail during I/O, or the media might require cleaning. It will be appreciated that many such types of error conditions can occur.

Figure 2:
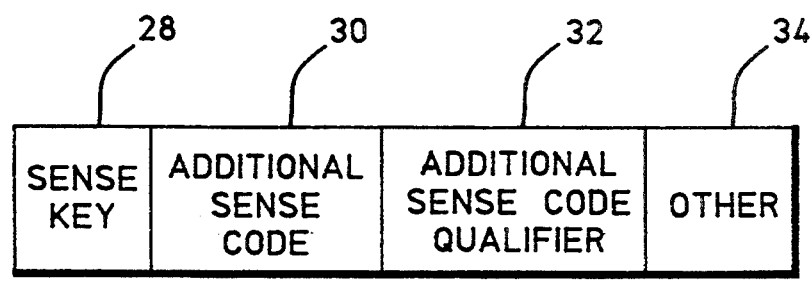
FIG. 2 is a schematic diagram of one type of error condition sense byte string generated by a data storage device.

In accordance with SCSI device operating principles, when an error condition does occur, e.g., in the first data storage device 22, the first data storage device 22 generates a string of sense bytes which is representative of the error. Each sense byte has a numeric or alphanumeric value. FIG. 2 shows one example of a sense byte error report which includes a first sense byte element 28. The value of the first sense byte element 28, typically referred to as a sense key, provides a coarse indication of the nature of the error. For example, the value of the first sense byte elements 28 may indicate that a problem exists with the media of the first data storage device 22.

The string of sense bytes generated by the first data storage device 22 may also include second, third, and fourth sense byte elements 30, 32, 34. The second sense byte element 30 is sometimes referred to as the additional sense code, and the third sense byte element 32 is sometimes referred to as the additional sense code qualifier.

It is to be understood that the values of the second, third, and fourth sense byte elements 30, 32, 34 provide further indication of the nature of the error, in addition to the indication provided by the first sense byte element 28. For example, the second and third sense byte elements together may indicate that the media problem is attributable to a media mechanical failure. Additional sense byte elements can also be provided, if desired. Thus, by reading the entire string of sense byte elements 28, 30, 32, 34, the error condition can be determined with greater granularity (i.e., with more precision) than would be possible if only the first sense byte element 28 were read.

It happens that the data storage devices 22, 24, 26 may not issue error condition reports using a common sense byte format. In the example shown in FIG. 2, the first data storage device 22 uses a sense byte format wherein an error condition is reported as a string of four sense byte elements 28, 30, 32, 34, with each element 28, 30, 32, 34 having, e.g., a two digit value.

On the other hand, the second data storage device 24 may use a sense byte format to report error conditions which is different from the sense byte format used by the first data storage device 22. For example, the second data storage device 24 may use greater or fewer sense byte elements than four, or may generate sense byte elements that have more or less than two digits, or may generate values in each sense byte element which represent a predetermined error and which are different from the values of the sense bytes generated by the first data storage device 22 under identical error conditions. Such differences in sense byte formats are attributable to differing storage device types and differing manufacturer specifications for the same type of storage device.

Nevertheless, it is desirable that the operating system 14 be capable of operating with many different data storage devices, each potentially reporting error conditions using a sense byte format unique to the device. It is also desirable, however, to avoid duplicating error recovery system design effort and implementation.

Accordingly, as disclosed more fully below, the error recovery modules 16a, 18a, 20a are substantially identical to each other, and indeed are interchangeable with each other. Consequently, only a single ERM need be provided, and the single ERM is then simply incorporated into each device driver 16, 18, 20 as the respective ERM 16a, 18a, 20a. It is to be understood that because of the interchangeability of the ERMs 16a, 18a, 20a, the ERMs 16a, 18a, 20a can be replaced by a single common ERM (not shown) that is incorporated into, e.g., the operating system 14. In such an embodiment, each device driver 16, 18, 20 is programmed to access the common ERM as required.

The details of the first ERM 16a can be appreciated in reference to FIG. 3. It is to be understood that the configuration of the second and third ERMs 18a, 20a are in all essential respects identical to the configuration of the first ERM 16a.

As shown in FIG. 3, the first ERM 16a includes a first sense byte decoder, generally designated 36. In accordance with the present invention, the first sense byte decoder 36 is arranged as a data table for correlating strings of first, second, third, and fourth sense byte elements 28, 30, 32, 34 from the first data storage device 22 to a respective numeric action token 38. As intended by the present invention and more fully disclosed below, each action token 38 represents a respective error condition. Thus, for example, the sense byte decoder 36 can be used to correlate a sense byte string consisting of "01, 01, 00, 00" to an action token "N+3".

In accordance with the above disclosure, the first sense byte decoder 36 can be used to provide as much granularity, i.e., precision, in error reporting as the first data storage device 22 will permit. For example, a first sense byte element 28 value of "01" may indicate a general error condition, e.g., "media error". The values of the second, third, and fourth sense byte elements 30, 32, 34 may then provide amplifying information, such as "blank media", "media failure", "media incompatibility", "media requires cleaning", and so on. Consequently, by decoding the entire sense byte string from the first data storage device 22, the first sense byte decoder 36 generates an action token 38 signal that represents the reported error condition with more granularity than would an action token signal based only upon the first sense byte element 28 (i.e., based only on the sense key).

It is to be understood that the ERM 16a includes second and third sense byte decoders (not shown) which are arranged substantially like the first sense byte decoder 36, i.e., which are arranged for correlating sense byte strings to respective action tokens. Unlike the first sense byte decoder 36, however, the second and third sense byte decoders are arranged for correlating sense bytes from the second and third data storage devices 24, 26, respectively, to action tokens.

Thus, the first ERM 16a includes a respective sense byte decoder for each data storage device sought to be coupled to the operating system 14. The sense byte decoders can be constructed by referring to the manufacturer's hardware interface specification for the associated data storage device, which typically lists sense byte strings generated by the device and the meanings of the sense bytes.

As stated above, data storage devices of a single type (e.g., tape drive, optical disk) but made by different manufacturers may use different sense byte formats to report the same error condition. For example, the first data storage device 22 may use a first format for reporting "media requires cleaning" and the second data storage device 24 may use a second sense byte format different from the first for reporting "media requires cleaning". Nonetheless, as recognized by the present invention, the necessary recovery actions are ordinarily the same, device to device, for each particular error, regardless of who manufactured the device.

With the above discussion in mind, the ERM 16a includes a plurality of token decoders, examples of which are shown in Appendix A. A respective token decoder is provided for each type of data storage device sought to be used by the operating system 14, i.e., a first token decoder is provided for optical disk devices, a second token decoder is provided for media changer devices, and a third token decoder is provided for magnetic tape devices.

Each token decoder of the present invention is arranged in tabular form, with the entering argument of each token decoder being an action token, e.g., the action token 38, from the sense byte decoder that is appropriate for the particular data storage device. The token decoder correlates each action token to one or more error recovery action codes, and the ERM 16a sends a signal representative of the error recovery action codes to the device driver 16 as more fully disclosed below. One or more of the error recovery actions which may be invoked for each action token can include, inter alia, 1. Log the error;
2. Issue a test unit ready SCSI command to the device 22;
3. Issue a SCSI device reset message to the device 22;
4. Issue a SCSI reserve unit command to the device 22;
5. Retry the last SCSI command to the device;
6. Delay for "n" seconds and then return;
7. Redo the mode select setting to the device;
8. Perform subsequent positioning of the tape cartridge;
9. Issue a SCSI start unit command to the device; and
10. Issue a SCSI read capacity command to the device.

Figure 4:
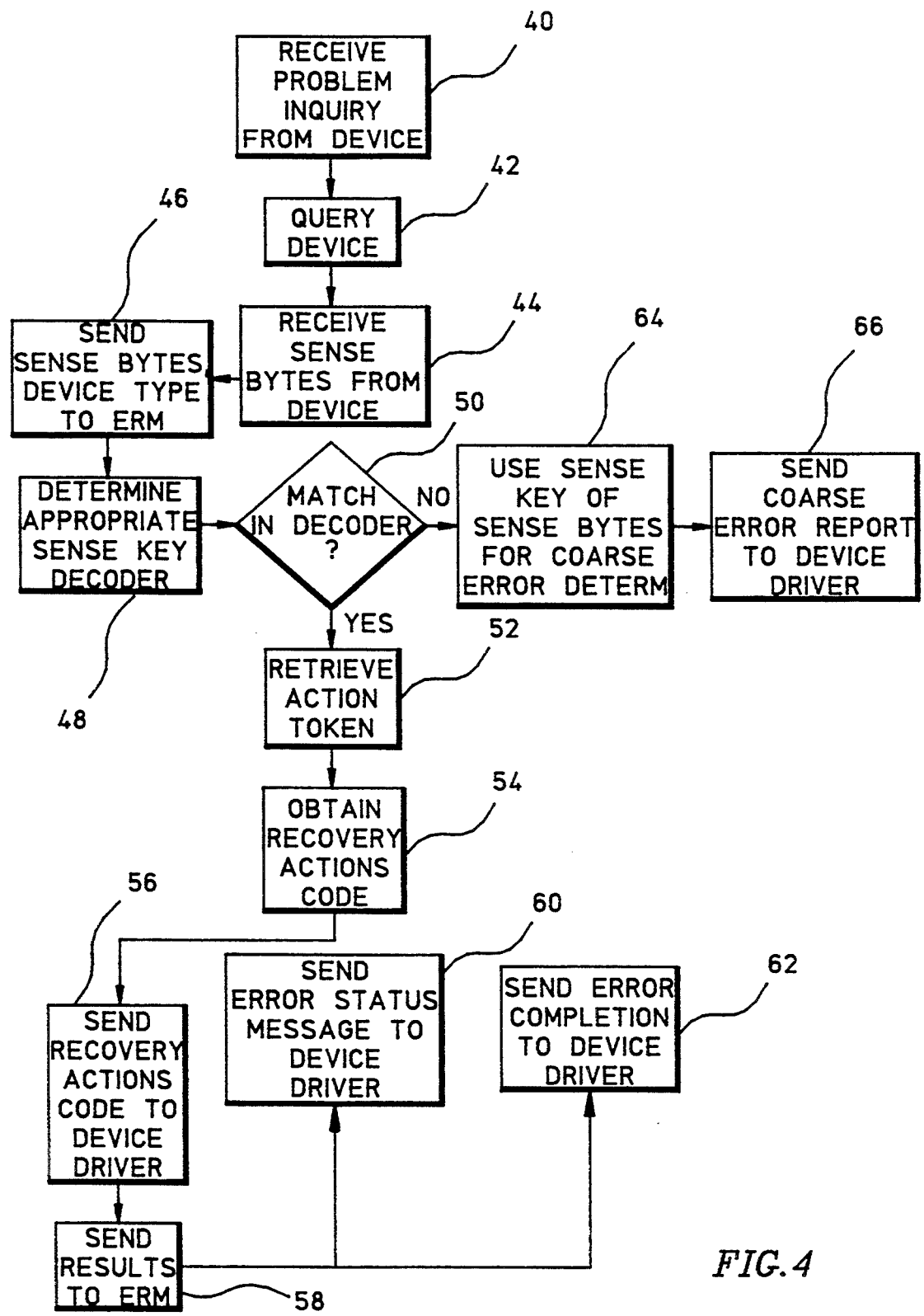
FIG. 4 is a flow chart of the error recovery logic of the present invention.

Now referring to FIG. 4, the error recovery logic of the present invention can be seen. For clarity of disclosure, the operation of the first device driver 16 with associated ERM 16a will be discussed. It is to be understood that the operation of the second and third device drivers 18, 20 and associated ERMs 18a, 20a are in all essential respects identical to the operation of the first device driver 16 and first ERM 16a.

As can be appreciated in reference to block 40 of FIG. 4, when an error condition occurs in the first data transfer device 22, the first data storage device 22 sends a problem inquiry the first device driver 16. The problem inquiry informs the first device driver 16 that an error condition is present in the first data storage device 22.

In response to the problem inquiry, the first device driver 16 queries the first data storage device 22 at block 42 for sense bytes which are representative of the particular error condition being experienced by the first data storage device 22. The first data storage device 22 sends the sense bytes to the first device driver, which receives the sense bytes at block 44.

Next, at block 46, the first device driver 16 sends the sense bytes to the first ERM 16a, along with a signal that represents the identity of the first data storage device 22. Additionally, in the presently preferred embodiment the first device driver 16 also sends pointers to the first ERM 16a that respectively indicate the structures within the first device driver 16 to which the recovery action code and error status and completion messages, described more fully below, are to be sent.

Then, at block 48, the first ERM 16a determines which sense byte decoder to use based upon the identity of the first data storage device 22. For purposes of disclosure, reference will be made to the first sense byte decoder 36 shown in FIG. 3.

Continuing with the logic of the present invention, the first ERM 16a moves to decision block 50, wherein the first ERM 16a determines whether a match exists between the sense bytes received at block 46 and the available entering arguments in the sense byte decoder 36. If a match exists, the first ERM 16a moves to block 52 and retrieves the correlating action token, e.g., the action token 38 shown in FIG. 3. It will be appreciated that blocks 48–52 establish a sense byte correlator.

Then, at block 54, the first ERM 16a obtains a recovery action code from the token decoder, using the action token retrieved at block 52 as the entering argument. The recovery action code represents one or more of the recovery actions 1–10 listed above and discussed in relation to FIG. 3 and Appendix A. As intended by the present invention, the action or actions represented by the recovery action code are appropriate for recovering from the reported error condition, for the type of first data storage device 22. Next, the first ERM 16a sends the recovery action code to the first device driver 16 at block 56, and in response the first device driver 16 commands the first data storage device 22 to execute the appropriate recovery action or actions. The skilled artisan will appreciate that blocks 54 and 56 establish an action executor.

Once the appropriate recovery action has been performed by the first data storage 22, the first data storage device 22 will transmit to the first device driver 16 (and, hence, first ERM 16a) a message which represents the results of the error recovery actions at block 58.

Then, the first ERM 16a sends an error status message representative of the nature of the error to the first device driver 16 at block 60, and the first device driver 16 can relay the error status to the operating system 14. Furthermore, at block 62, the first ERM 16a sends an error completion message representative of the results of the error recovery actions to the first device driver 16, and the first device driver 16 can relay the error completion message to the operating system 14. If desired, the first ERM 16a can also sends a message to the first device driver 16 which is representative of the residual count of bytes not transferred between the operating system 14 and the first data storage device 22.

Referring back to block 50, if a match was not found to exist between the sense bytes received at block 46 and the available entering arguments in the sense byte decoder 36, the first ERM 16a moves to block 64, wherein the first ERM 16a determines a coarse error description based upon the sense key, i.e., the first sense byte element 28. Such a match failure can occur when the manufacturer's hardware interface specification used to generate the sense byte decoder 36 is out of date. At block 66, the first ERM 16a reports the coarse error description to the first device driver 16.

While the particular method and apparatus for error recovery in computer peripheral devices as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

I claim:

1. In a host computer including a first device driver and a second device driver operable in response to respective first and second command sequences for causing data transfer between the host computer and respective first and second data storage devices, each data storage device generating sense bytes representative of an error condition in the data storage device, an error recovery module operably couplable to each of the device drivers, comprising:

a sense byte correlator for receiving the sense bytes from the data storage device and for generating one of a plurality of action tokens corresponding with the received sense bytes in response thereto; and an action executor for receiving the action token and for generating an action signal representative of one of a plurality of predetermined error recovery actions in response thereto, wherein the error recovery module sends the action signal to the device driver for facilitating error recovery.

2. The error recovery module of claim 1, comprising a first error recovery module associated with the first device driver and a second error recovery module associated with the second device driver, wherein the first error recovery module is interchangeable with the second error recovery module.

3. The error recovery module of claim 1, wherein the error recovery module is common to all of the device drivers.

4. The error recovery module of claim 1, wherein the sense byte correlator includes first and second sense byte decoders respectively representing the first and second data storage devices, and wherein each sense byte decoder correlates sense bytes from the associated storage device to the action tokens, with the first data storage device having operating characteristics different from the operating characteristics of the second data storage device.

5. The error recovery module of claim 4, wherein the action executor includes a token decoder arranged for correlating action tokens received from the sense byte correlator to the predetermined error recovery actions.

6. The error recovery module of claim 5, wherein at least one of the data storage devices generates a respective plurality of sense bytes in response to each one of a predetermined plurality of error conditions in the data storage device, and the sense byte correlator generates the action token based upon each one of the sense bytes in the plurality of sense bytes generated by the data storage device.

7. A computer system, comprising:

a host computer;

a first data storage device coupled to the host computer for data transfer therebetween, wherein the first data storage device generates a first set of sense bytes when an error occurs in the first device;

a second data storage device coupled to the host computer for data transfer therebetween, wherein the second data storage device generates a second set of sense bytes different from the first when the error occurs in the second data storage device;

a first device driver for controlling data transfer between the host computer and the first data storage device;

a first error recovery module associated with the first device driver for generating an action signal representative of a predetermined error recovery action in response to the first set of sense bytes;

a second device driver for controlling data transfer between the host computer and the second data storage device; and a second error recovery module associated with the second device driver for generating an action signal representative of a predetermined error recovery action in response to the second set of sense bytes, wherein the first error recovery module is substantially identical to the second error recovery module.

8. The computer system of claim 7, wherein the first error recovery module includes:

a sense byte correlator for receiving the sense bytes from the first data storage device and for generating one of a plurality of action tokens in response thereto; and an action executor for receiving the action token and for generating the action signal in response thereto, wherein the error recovery module sends the action signal to the device driver for facilitating error recovery.

9. The computer system of claim 8, wherein the sense byte correlator includes first and second sense byte decoders respectively representing the first and second data storage devices, and wherein each sense byte decoder correlates sense bytes from the associated storage device to the action tokens, with the first data storage device having operating characteristics different from the operating characteristics of the second data storage device.

10. The computer system of claim 9, wherein the action executor includes a token decoder arranged for correlating action tokens received from the sense byte correlator to the predetermined error recovery actions.

11. The computer system of claim 10, wherein the first data storage device generates a respective plurality of sense bytes in response to each one of a predetermined plurality of error conditions in the data storage device, and the sense byte correlator generates the action token based upon each one of the sense bytes in the plurality of sense bytes generated by the data storage device.

12. A data transfer system, comprising:
an operating system;
a plurality of data storage devices associated with the operating system, each data storage device being responsive to a respective command sequence for transferring data between the data storage device and the operating system, wherein the command sequence of one data storage device is different from the command sequence of another data storage device;
a plurality of device drivers respectively associated with the data storage devices for controlling data transfer between the data storage devices and the operating system; and
error recovery means operably couplable to each of the device drivers, the error recovery means including:
correlating means for receiving sense bytes from one of the data storage devices and for generating one of a plurality of action tokens corresponding with the received sense bytes in response thereto; and
executor means for receiving the action token and for generating an action signal representative of one of a plurality of predetermined error recovery actions in response thereto.

13. The data transfer system of claim 12, comprising a first error recovery means associated with the first device driver and a second error recovery means associated with the second device driver, wherein the first error recovery means is interchangeable with the second error recovery means.

14. The data transfer system of claim 12, wherein the error recovery means is common to all of the device drivers.

15. The data transfer system of claim 12, wherein the correlating means includes first and second sense byte decoders respectively representing the first and second data storage devices, and wherein each sense byte decoder correlates sense bytes from the associated storage device to the action tokens.

16. The data transfer system of claim 15, wherein the executing means includes a token decoder for correlating action tokens received from the correlating means to the predetermined error recovery actions.

17. The data transfer system of claim 16, wherein at least one of the data storage devices generates a respective plurality of sense bytes in response to each one of a predetermined plurality of error conditions in the data storage device, and the correlating means generates the action token based upon each one of the sense bytes in the plurality of sense bytes generated by the data storage device.

18. A method for error recovery during data transfer between an operating system and a plurality of data storage devices responsive to respective device drivers, each device driver generating a respective command sequence, wherein the command sequence of one data storage device is different from the command sequence of another data storage device, comprising the steps of:
(a) receiving sense bytes from one of the data storage devices and generating one of a plurality of action tokens corresponding with the received senses bytes in response thereto; and
(b) receiving the action token and generating an action signal representative of one of a plurality of predetermined error recovery actions in response thereto.

19. The method of claim 18, wherein each element of the sense bytes from the data storage device is used to generate the action token.

20. A method for error recovery in an operating system having a plurality of device drivers respectively associated with a plurality of data storage devices, comprising:
(a) receiving sense bytes representative of an error condition from any one of a plurality of data storage devices, wherein first and second data storage devices in the plurality of data storage devices are responsive to respective first and second command sequences, and the first command sequence is different from the second command sequence;
(b) correlating the sense bytes to an action token based upon the characteristics of the one data storage device; and
(c) determining a recovery action for the error condition in response to the action token.

21. The method of claim 20, wherein each element of the sense bytes from the data storage device is used to generate the action token.

* * * * *

UNITED STATES PATENT AND TRADEMARK OFFICE
CERTIFICATE OF CORRECTION

PATENT NO. : 5,450,579
DATED : September 12, 1995
INVENTOR(S) : Johnson

It is certified that error appears in the above-indentified patent and that said Letters Patent is hereby corrected as shown below:

Column 12, line 33, please change "senses" to --sense--.

Signed and Sealed this

Twenty-sixth Day of December, 1995

Attest:

BRUCE LEHMAN

*Attesting Officer*  *Commissioner of Patents and Trademarks*